United States Patent [19]

Crane

[11] Patent Number: 5,450,321
[45] Date of Patent: * Sep. 12, 1995

[54] INTERACTIVE DYNAMIC REALTIME MANAGEMENT SYSTEM FOR POWERED VEHICLES

[76] Inventor: Harold E. Crane, P.O. Box 6169, Kingwood, Tex. 77325-6169

[*] Notice: The portion of the term of this patent subsequent to Oct. 26, 2010 has been disclaimed.

[21] Appl. No.: 99,138

[22] Filed: Jul. 29, 1993

Related U.S. Application Data

[63] Continuation-in-part of Ser. No. 745,061, Aug. 12, 1991, Pat. No. 5,257,190.

[51] Int. Cl.⁶ ................. G01M 15/00; G05B 15/02
[52] U.S. Cl. .................. 364/424.04; 364/431.11; 73/117.2; 307/10.6; 307/10.7; 320/2
[58] Field of Search .......... 304/424.04, 424.03, 304/424.01, 431.11, 431.12; 73/116, 117.2; 320/2, 9, 12, 21, 32; 123/179.3, 41.27, 41.29; 307/10.6, 10.7; 322/99; 431/12

[56] References Cited

U.S. PATENT DOCUMENTS

| | | | |
|---|---|---|---|
| 3,673,588 | 6/1972 | Riff | 340/455 |
| 4,247,813 | 1/1981 | Gansert et al. | 320/48 |
| 4,258,421 | 3/1981 | Juhasz et al. | 364/424.04 |
| 4,310,888 | 1/1982 | Furuhashi et al. | 364/431.1 |
| 4,316,134 | 2/1982 | Balan et al. | 322/99 |
| 4,334,425 | 6/1982 | Crane | 73/112 |
| 4,342,022 | 7/1982 | Nichol | 340/455 |
| 4,402,054 | 8/1983 | Osborne et al. | 364/554 |
| 4,628,872 | 12/1986 | Ogawa et al. | 123/41.27 |
| 4,678,998 | 7/1987 | Muramatsu | 324/427 |
| 4,757,463 | 7/1988 | Ballou et al. | 364/424.04 |
| 4,843,575 | 6/1989 | Crane | 364/550 |
| 4,891,971 | 1/1990 | Jones et al. | 73/117.3 |
| 4,929,931 | 5/1990 | McCuen | 340/636 |
| 4,937,528 | 6/1990 | Palanisamy | 320/48 |
| 4,939,502 | 7/1990 | Ito et al. | 340/438 |
| 4,965,549 | 10/1990 | Koike | 340/516 |
| 4,978,291 | 12/1990 | Nakai | 431/12 |
| 4,990,885 | 2/1991 | Irick et al. | 340/455 |
| 5,003,478 | 3/1991 | Kobayashi et al. | 364/424.03 |
| 5,003,479 | 3/1991 | Kobayashi et al. | 364/424.03 |
| 5,012,421 | 4/1991 | Ishii | 364/431.1 |
| 5,034,889 | 7/1991 | Abe | 364/424.04 |
| 5,056,023 | 10/1991 | Abe | 364/424.03 |
| 5,063,513 | 11/1991 | Shank et al. | 364/424.5 |
| 5,072,391 | 12/1991 | Abe | 364/424.04 |
| 5,091,856 | 2/1992 | Hasegawa et al. | 364/424.05 |

*Primary Examiner*—Kevin J. Teska
*Assistant Examiner*—Tan Nguyen
*Attorney, Agent, or Firm*—Foley & Lardner

[57] ABSTRACT

A dynamic realtime management system for a powered vehicle includes a microprocessor for sensing realtime parameters related to the condition of the powered vehicle. A plurality of input sensors are connected to components of the powered vehicle to transmit condition information to the microprocessor. A memory stores the sensed values of the realtime parameters and the programs for defining relationships between certain of the sensed values of the realtime parameters. A display produces a humanly perceivable signal related to the condition information. The microprocessor is connected to the display to transmit a condition output to the display. The microprocessor is programmed to determine continuously and automatically a plurality of unknown values relative to the conditions of the powered vehicle as a function of the sensed values of the realtime parameters. The microprocessor produces an interaction indication result for determining the status of the components of the powered vehicle. The operator of the powered vehicle has direct access to information generated from the management system in order to enable the operator to make reasonable, logical management decisions to cure costly problems and inefficiencies quickly and reliably.

33 Claims, 10 Drawing Sheets

FIG. 1

1 ALTERNATOR BELT
2 BATTERY
3 ALTERNATOR MOTOR
4 REGULATOR
5 STARTER SWITCH
6 SOLENOID (STARTER)
7 STARTER MOTOR
8 WATER TEMPERATURE
9 WATER PRESSURE
10 WATER PUMP
11 WATER PUMP BELT
12 VOLTAGE-PRESSURE SWITCH
13 COMPRESSOR MOTOR OUTPUT
14 COMPRESSOR BELT
15 AIR COND./BLOWER MOTOR
16 FREON LEVEL
17 COOLING TEMPERATURE

39 TORQUE
40 RPM
41 HORSEPOWER
42 SPEED (AIR)
43 HEIGHT / ALTITUDE

20 LOAD
21 DISTANCE
22 COSTS FUEL ETC.
23 SCHEDULE
24 LABOR COSTS
25 REPAIR COSTS
26 STOPS
27 TIME
28 FUEL FLOW

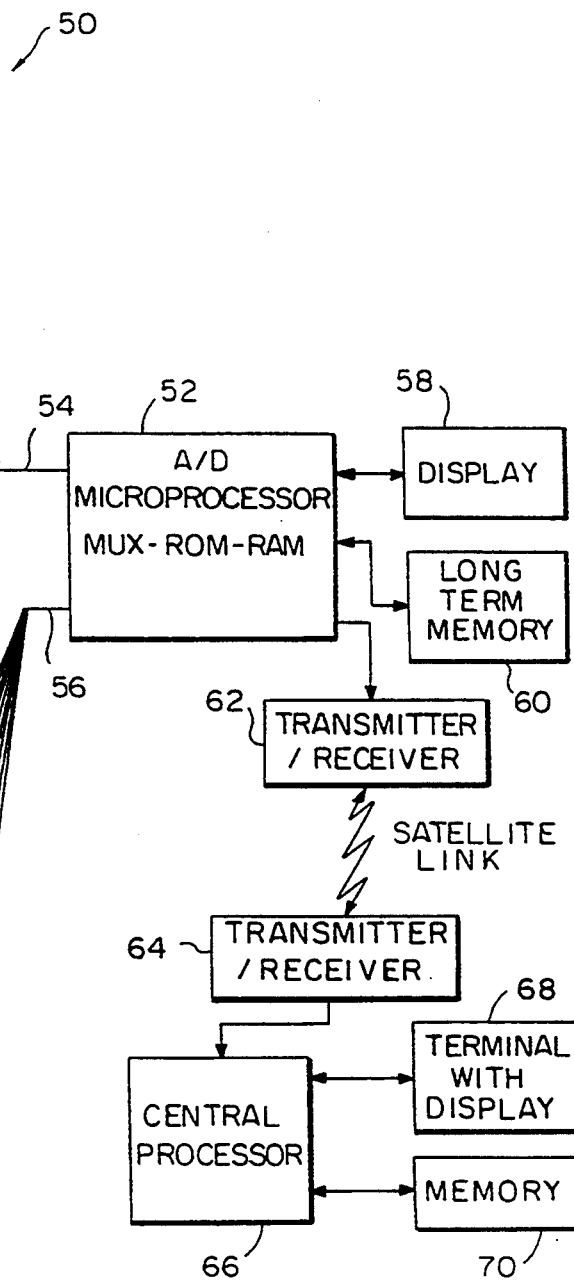

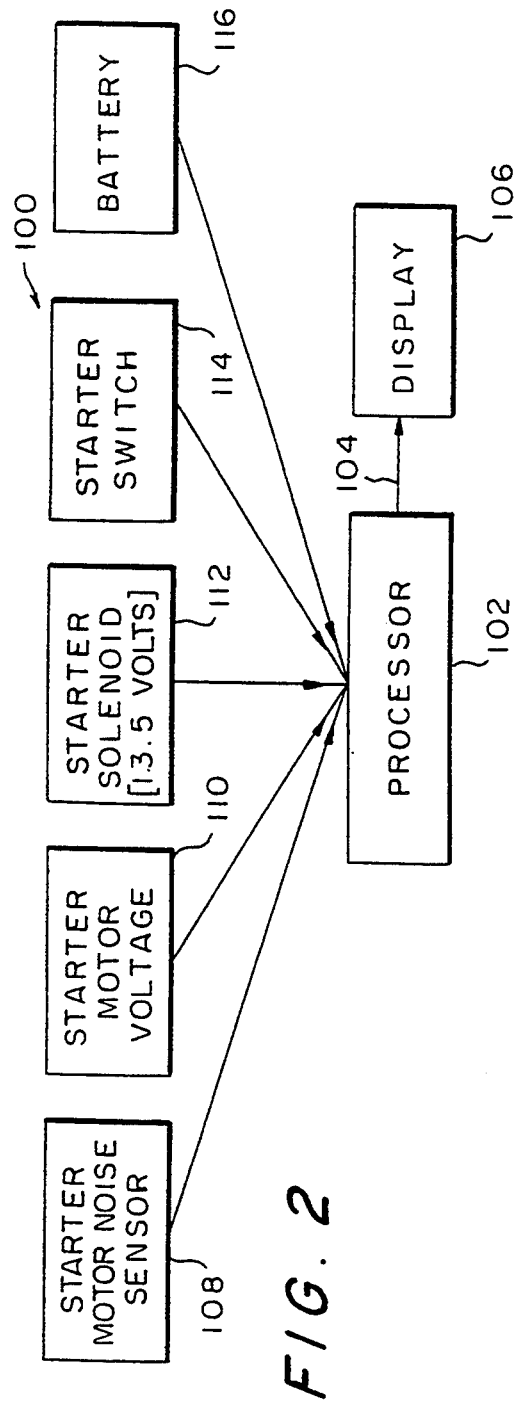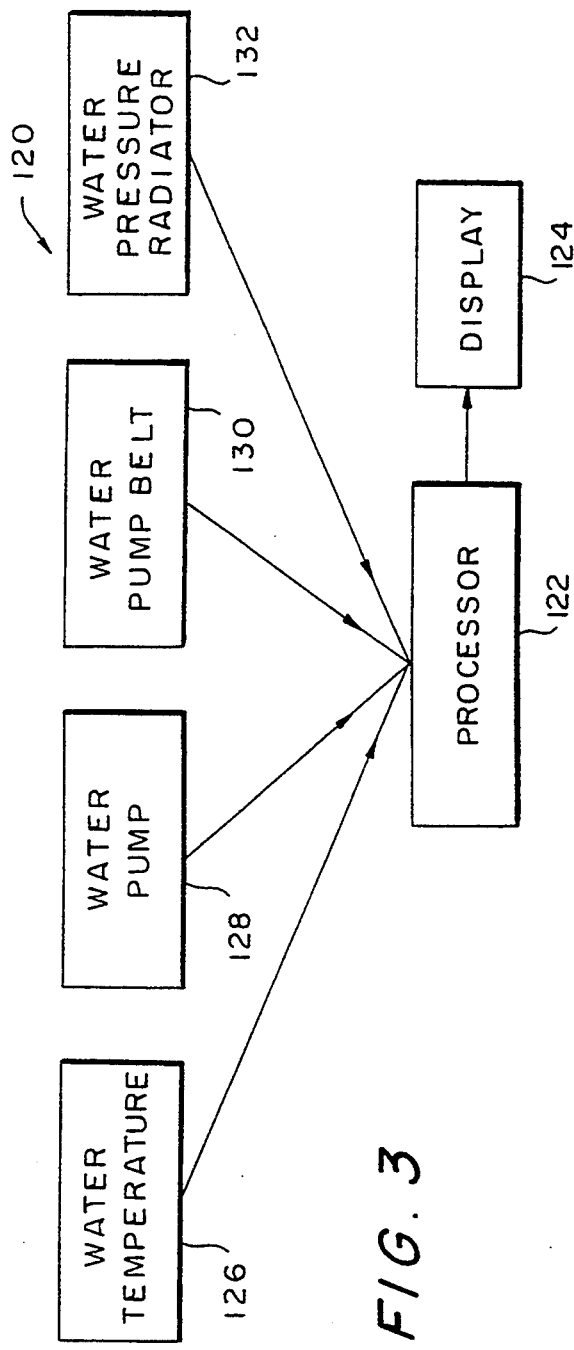

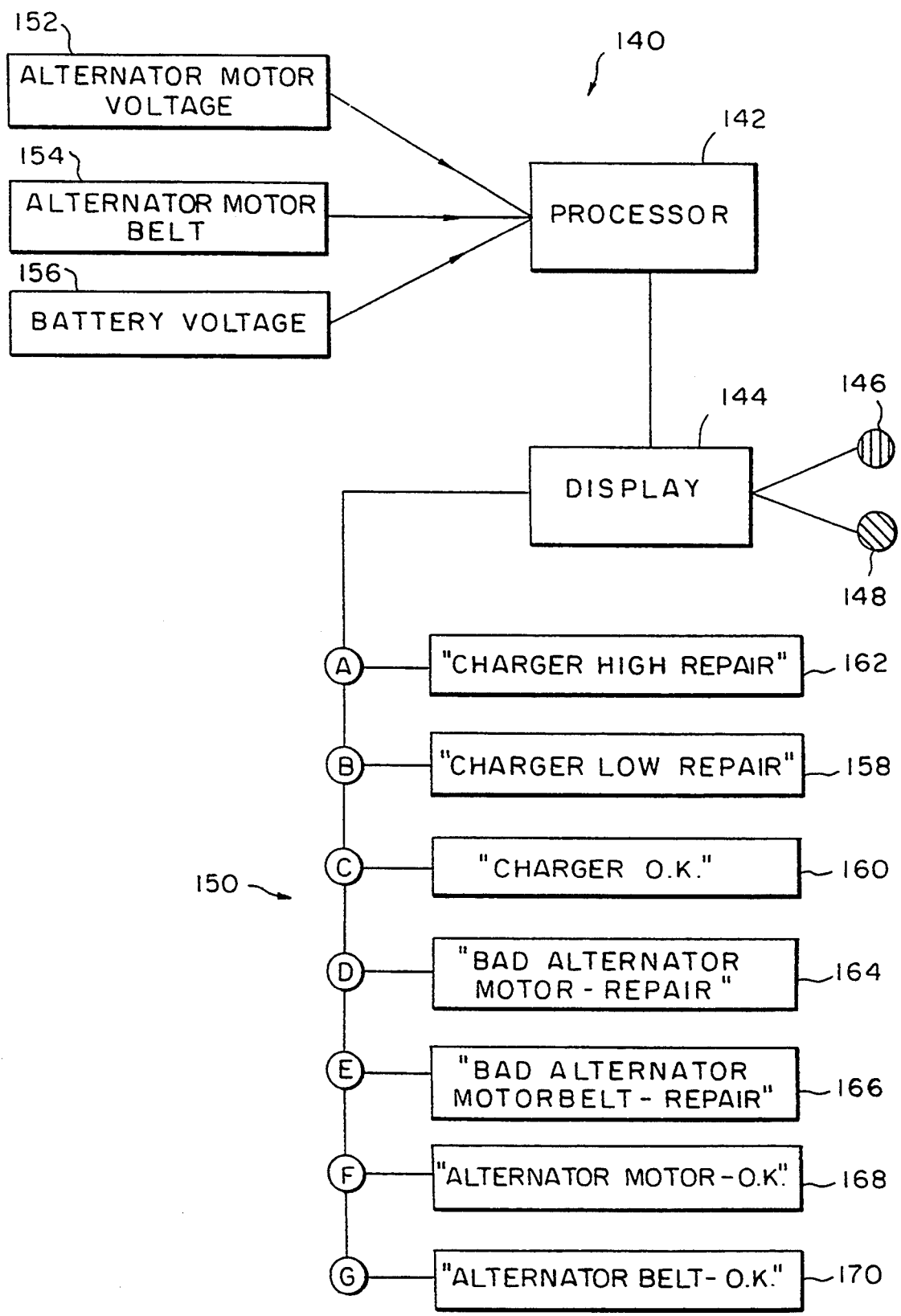

INTERACTIVE DYNAMIC REALTIME MANAGEMENT SYSTEM FOR POWERED VEHICLES

RELATED APPLICATIONS

The present application is a continuation-in-part of U.S. patent application Ser. No. 07/745,061, filed on Aug. 12, 1991, and entitled "INTERACTIVE DYNAMIC REALTIME MANAGEMENT SYSTEM FOR POWERED VEHICLES", now U.S. Pat. No. 5,257,190.

BACKGROUND OF THE INVENTION

The present invention relates to the operation and management of powered vehicles which utilize batteries and engine systems. More particularly, the present invention relates to a realtime management system for identifying system inefficiencies and subsystems requiring repair through the use of realtime interactive computer analysis.

The powered vehicles referred to in this application include ships, locomotives, aircraft of all types, and automotive vehicles such as cars, trucks and buses. The powered vehicles employ starter systems, battery systems, charging systems, and cooling systems for the efficient and effective operation of such vehicles. Degradation of system components of the powered vehicle result in the inability to start the vehicle. Additionally, the degradation in the system components can also cause the vehicle to run improperly or cause the operator to be unable to use the powered vehicle effectively.

Various techniques have been employed in the past to monitor particular components of the powered vehicle. Unfortunately, translation and interpretation of the results of the techniques is always left to a mechanic, or other person, to analyze the problem and make a recommendation as to repair. There is usually no monitor of the translation and interpretation carried out by the mechanic. All known monitoring systems are single purpose measuring devices. They do not compare other measurements at the same time and interact the effects of each of the components. As such, synergistic or combination effects are ignored in traditional monitoring systems. Typical monitoring systems only indicate one specific matter or suggest a general problem. Present monitoring systems do not provide a constant realtime reading continually throughout the monitoring of the components of the system.

Monitor-type systems provide only "after the fact" information. For example, if a component of the powered vehicle is degrading, a red light or warning buzzer will indicate to the operator of the vehicle that the operator should do something about the component. The monitor-type systems do not explain, in realtime, exactly what the problem is and what to do about the problem. Automobile manufacturers provide light or buzzer warnings or a lighted graphic of the area of the problem. When the trouble is diagnosed as to the specific problem, then the repair will cause the indicator light to turn off.

With regard to specific systems within an automobile, it becomes very difficult to analyze specific problems as they are occurring throughout the automobile's engine system. For example, in a vehicle air conditioner, the only indication of an air conditioner problem is when the air delivered from the air conditioner is not cooled. It is necessary to consult a mechanic to determine the problem. As another example, with the water motor cooling system, a light on the automobile dashboard will illuminate so as to inform the operator that the motor is overheating. Once again, the mechanic must be employed so as to determine the specific problem. After repairs are made, the light will no longer be illuminated. With respect to the battery system of a vehicle, the battery light provides an indication of a problem. However, a mechanic must be employed so as to locate the particular area of difficulty. A problem with battery systems can originate in the battery, the charger, the cutout, or in overloads. Many times the mechanic must continually change out parts until the specific cause of the battery problem is located. With respect to the starter system of a vehicle, the indicator light will be illuminated when the automobile will not start. A mechanic must be employed to figure out if the problem is the wiring, the starter, the solenoid, or the battery.

U.S. Pat. No. 4,843,575 issued on Jun. 27, 1989, to the present inventor. U.S. Pat. No. 4,843,575 describes an "Interactive Dynamic Realtime Management System". This system was configured for the purposes of sensing the degradation of system components in a powered system. The invention described in this patent utilizes a plurality of powered systems and a central management facility. Each of the powered systems includes a processor which receives inputs from realtime sensors relating to realtime variables affecting the operation of the powered system. A monitoring memory is provided for the processors to store the data related to the realtime input as well as data related to manual inputs for fixed parameters. An interactive terminal is also provided. The local processor is programmed to determine various efficiency-related parameters based upon presently measured variables as well as stored historical data relevant to the presently measured variables. The stored historical data is used to give an indication of the present relative state of the parameters of interest. The local processors are programmed to calculate the costs of presently occurring inefficiencies in order to provide the operator of each powered system with data on which to make a decision concerning the control of the power plant. In particular, the operator is provided with information as to whether or not a subsystem is operating inefficiently and the cost of the inefficient operation in units of capital expended per lapse of time. In this manner, the operator is able to make immediate decisions to change certain control parameters so as to notice an immediate increase or decrease in efficiency.

The invention of U.S. Pat. No. 4,843,575 has particular application to the marine industry where it is used to determine certain factors as cost of hull degradation, engine performance, shallow water power levels, efficiency of rudder and steering systems, trim and ballasting underway and electrical power generation. The dynamic interactive realtime management system of powered vehicles of the present invention is based, in part, on the technology of U.S. Pat. No. 4,843,575. U.S. Pat. No. 4,843,575 is incorporated by reference herein.

U.S. Pat. No. 4,334,425 issued on Jun. 15, 1982 to the present inventor, provides a system for indicating the presence of fuel penalties brought on by inefficient power plant components or degradation in performance of components. The system of this patent is adapted for use in marine applications. It utilizes strategically located continuous operating sensors. The information from these sensors is sampled and analyzed to produce an output representative of the plant efficiency at the moment. The outputs include indications of fuel use per hour, fuel consumption per distance traveled, and power plant efficiency. A plurality of secondary inputs are provided so as to give indications of the plant operating pressures, temperatures, etc. When a fuel penalty is indicated, the secondary inputs are evaluated to determine any significant change in output levels, thus giving evidence as to the location of the source of the fuel penalty.

Various systems have been developed in the past for the monitoring of specific conditions affecting an automobile battery. For example, U.S. Pat. No. 3,673,588, issued on Jun. 27, 1972 to J. A. Riff, shows an indicating circuit for use in a vehicle's electrical system. This device employs one or more indicating lamps to give a visual indication of the various operating conditions of the dynamoelectric machine so as to indicate failure of an alternator or regulator component or to indicate below normal, normal, or above normal voltage outputs therefrom. U.S. Pat. No. 4,247,813, issued on Jan. 27, 1981, to Gansert et al. describes an on-board vehicular electrical power supply system. This invention utilizes an LED which is triggered to illuminate upon triggering by one of two threshold-sensing circuits which sense undervoltage and overvoltage conditions of the battery beyond a predetermined voltage range. U.S. Pat. No. 4,316,134, issued on Feb. 16, 1982 to Balan et al. shows a fault-indicating circuit for an automobile alternator battery charging system. The fault indicating circuit utilizes a low-voltage detector circuit which provides constant DC excitation for an indicator lamp in response to low alternator output voltage and a high voltage detector circuit which provides intermittent excitation for the lamp in response to an excessively high alternator output voltage. The lamp is maintained in a de-energized state in response to the normal alternator output voltage. U.S. Pat. No. 4,342,022, issued on Jul. 27, 1982 to T. Nichol shows a warning lamp which is connected in a collector circuit of the Darlington transistor which is energized if the alternator does not produce an output or a malfunction occurs in the charging system. U.S. Pat. No. 4,929,931, issued on May 29, 1990 to S. W. McCuen shows a battery monitor including a voltage measuring means for measuring the voltage of the battery and a processor which is coupled to this voltage measuring means. The processor utilizes the voltage measurement to determine the presence or absence of the battery, whether the battery voltage is equal to or greater than a nominal voltage level, and whether the discharge rate of the battery is greater than a selected discharge rate. U.S. Pat. No. 4,939,502, issued on Jul. 3, 1990 to Ito et al. shows a fail-safe control device which detects the battery voltage, stores a standard battery voltage, and makes a comparison between the battery voltages so as to switch to an emergency mode of turning off the shift solenoids when the voltage deviates from the standard upon the comparison. U.S. Pat. No. 4,965,549, issued on Oct. 23, 1990 to T. Koike provides a warning device for an internal combustion engine which operates from the engine ignition circuit upon initial starting so as to provide self-checking of the engine. U.S. Pat. No. 4,990,885, issued on Feb. 5, 1991 to Irick et al. shows an auxiliary battery monitor. In this auxiliary battery monitor, the voltage differential between the primary and auxiliary sources is measured by coupling them to a voltage comparison device. A pair of voltage dividing resistor pairs provide inputs to an operational amplifier when the voltage differential is above a predetermined value.

U.S. Pat. No. 5,003,478, issued on Mar. 26, 1991 to Kobayashi et al. describes a diagnostic system for a motor vehicle. This diagnosis device includes a computer having a central processing unit and a memory. The memory has a plurality of programs for diagnosing an electronic control system for controlling an engine. An indicator section and a display are provided. The control unit of this diagnosis device receives input and output data of an element in the electronic control system and drives the indicator so as to indicate operating conditions of the element in accordance with the input and output data.

The '478 patent to Kobayashi et al. has various deficiencies. First, the '478 system cannot work on a travelling vehicle. The '478 system does not evaluate the battery when the vehicle is locked up and turned off, or otherwise not running. The '478 system indicates responses to individual sensory information only, not gradual changes. As such, it is not a management evaluator system. It is a diagnostic system for mechanics for the purpose of diagnosing a problem and its solution. The '478 devices require a person to operate the system. In particular, a manual keyboard is required to punch in a code in order to obtain battery voltage. After battery voltage is received, a person is required to evaluate this battery voltage. The device does not tell the driver what to do while the driver is driving. The system functions only when the vehicle is stationary. The electronics of the system do not measure battery degradation or the cause of battery problems. Without a plurality of input sensors, it is impossible to tell whether the accessories and starting loads are affecting the battery. The '478 device does not alert one as to when it is time to replace a battery. The device is not designed to determine how cold or hot temperatures affect the starting capacity of the battery. The system does not evaluate effects of battery voltage, battery temperature, and battery loads on the battery's life over time and usage. The '478 device is not designed to insert loads automatically across the battery terminals, twenty-four hours a day, every hour or so, and correlate this information with time, battery voltage, battery temperatures and current drains so as to automatically evaluate cold cranking amps.

In general, the chemical processes within a wet-cell lead-acid storage battery are extremely complex and dynamic, i.e., dependent upon many parameters which are themselves changing with time. These parameters include cell temperature, charge state of the battery, charge interval, and discharge history.

The chemical process involving a battery may be summarized as follows. When two unlike metals such as lead dioxide (the positive plate) and lead (the negative plate) are submerged in sulfuric acid, a voltage potential is developed across terminals connected to the plates.

During the discharge cycle, lead in the positive plate combines with sulfate in the sulfuric acid to form lead sulfate (which is deposited on the positive plate) with the by-products hydrogen (from the acid) and oxygen (from the positive plate) combining to produce water and thus dilute the concentration of the sulfuric acid. Consequently, the specific gravity of the acid decreases with dilution by water produced by the discharge cycle. Thus, specific gravity of the sulfuric acid can be used as a measure of the charge state of the battery. At the same time, lead of the negative plate is combined with sulfate from the sulfuric acid to produce lead sulfate on the negative plate. As the discharge process continues, more and more lead sulfate is deposited on both the positive and negative plates until they are no longer dissimilar metals. At this point no voltage potential is produced between terminals connected to the two plates. Also, as the battery discharges, the internal thevenin resistance increases from a full charge low value of 10–20 milliohms.

During the charge cycle, the reverse chemical reactions of the discharge cycle occur. The lead sulfate of both plates is split into its original form of lead and sulfate. The water is split into hydrogen (given off at the negative plate) and oxygen (given off at the positive plate). As the sulfate leaves the plates, it combines with the hydrogen to form sulfuric acid, thus increasing the concentration of the acid. At the same time, oxygen combines with lead in the positive plate to form lead sulfate. Thus, the lead and lead sulfate concentrations of the negative and positive plates, respectively, is restored.

SUMMARY OF THE INVENTION

It is an object of the present invention to provide a dynamic interactive fully automated realtime management system for enhancing the management and technical operating efficiency of powered vehicles.

It is another object of the present invention to provide a realtime management system in which the operator of a powered vehicle is able to interact with the management system in order to make decisions and to improve the efficiency of the powered system based upon realtime information provided by the management system.

It is another object of the present invention to give the operator of the powered vehicle a continual update of system or parts degradation.

It is another object of the present invention to provide a management system which eliminates the need for diagnostic services.

It is still a further object of the present invention to provide a management system that assists the operator in making a proper decision of the need for repairs and the quality of the repairs.

It is yet a further object of the present invention to provide a management system that assists the operator in deciding whether or not to replace a battery.

These and other objects and advantages of the present invention are achieved by a dynamic realtime management system for managing the condition of a powered vehicle, the management system comprising a microprocessor for sensing a plurality of realtime parameters associated with the powered system, a memory for storing the sensed values of the realtime parameters and storing a plurality of programs for defining relationships between certain of the sensed values of the realtime parameters, and a display for producing a humanly perceivable signal related to the condition information of the components of the powered vehicle. Suitable input sensors are connected to the components of the powered vehicle to deliver values of the realtime parameters to the microprocessor. The microprocessor is programmed to determine automatically a plurality of unknown values relative to the conditions of the powered vehicle as a function of the sensed values of the realtime parameters by individually selecting the unknown values to be determined. The microprocessor determines the interactions between the sensed values using the stored programs. The microprocessor produces an interaction indication result. The microprocessor also produces a condition output indicative of the relationship of the condition information and the interaction indication result. The microprocessor transmits the condition output to the display so that the condition of the components of the powered vehicle can be observed by the operator of the powered vehicle.

A terminal is connected to the microprocessor for selecting a desired output to be transmitted to the display. An analog-to-digital converter is connected between the input sensors and the microprocessor to convert the analog input of the input sensors into a digital input to the microprocessor. A power source is connected to the microprocessor for supplying a voltage to the microprocessor independent of the power system of the powered vehicle.

The microprocessor is programmed to determine interactions by commanding that certain realtime parameters be held constant to act as comparators in order to sense changes in other realtime parameters. The terminal allows management information to be input to the microprocessor. The microprocessor interacts the management information with the realtime parameters.

In particular, in the present invention, the powered vehicle is an automobile. The condition output can be the battery condition, the charging system condition, the motor cooling system condition, or the starter condition of the vehicle.

Where the present invention is applied for managing the condition of the starting system, the input sensors comprise a starter motor noise sensor, a starter motor voltage sensor, a starter solenoid sensor, a starter switch sensor, and a battery sensor. Where the management system of the present invention is associated with the motor cooling system of a vehicle, the input sensors comprise a water temperature sensor, a water pump sensor, a water pump belt sensor, and a water pressure sensor. Where the management system of the present invention is applied to the condition of a charging system of a vehicle, the input sensors comprise an alternator motor voltage sensor, an alternator motor belt sensor, and a battery voltage sensor. In each of these instances, the microprocessor interacts each of the inputs from the sensors. The microprocessor is programmed so as to interact the realtime parameters in the event of a single abnormal parameter. The microprocessor transmits a signal to the display indicative of a cause of the single abnormal parameter. The display can also indicate the action which is necessary so as to cure the cause of the single abnormal parameter.

The present invention also includes a dynamic realtime management system for managing the condition of a battery of a powered vehicle, the management system including a battery voltage sensor for measuring voltage of the battery, a battery temperature sensor for measuring temperature of the battery, a microprocessor connected to the voltage and the temperature sensors for continuously and automatically sensing the voltage and the temperature, a memory for storing values of the voltage and the temperature, an electronic load connected to the battery and the microprocessor and selectively applied to the battery by the microprocessor for drawing a desired amperage of the battery in a prescribed time sequence, and a display, connected to the microprocessor, for producing a humanly perceivable signal, wherein the microprocessor continuously and automatically determines the condition of the battery and transmits a signal indicative thereof to the display.

An analog-to-digital converter is connected between the sensors and the microprocessor to convert the analog output of the sensors into a digital input to the microprocessor. A power source is connected to the microprocessor for supplying a power voltage to the microprocessor independent of the power system of the powered vehicle.

The present invention is also a method of monitoring the condition of a battery of a powered vehicle. The method includes the steps of measuring an open circuit terminal voltage of the battery, measuring a temperature of the battery, applying an electronic load to the battery to draw a desired amperage, calculating an estimated internal resistance of the battery by dividing the desired amperage by a voltage across the battery measured when the electronic load is applied, calculating cranking amp capacity of the battery by dividing the open circuit terminal voltage by the estimated internal resistance, applying a temperature correction factor to the cranking amp capacity to determine cold cranking amp capacity of the battery, and transmitting a signal to a driver of the powered vehicle indicative of the cold cranking amp capacity of the battery.

BRIEF DESCRIPTION OF THE DRAWINGS

FIG. 1 is a block diagram showing the inputs and outputs for a local processor and a transmission link between the local processor and the central processor;

FIG. 2 is a block diagram showing the management system of the present invention as applied to the starting system of a powered vehicle;

FIG. 3 is a block diagram showing the management system of the present invention as applied to the motor cooling system;

FIG. 4 is a block diagram showing the management system of the present invention as applied to the charging system of a powered vehicle;

DETAILED DESCRIPTION OF THE INVENTION

Figure 5:
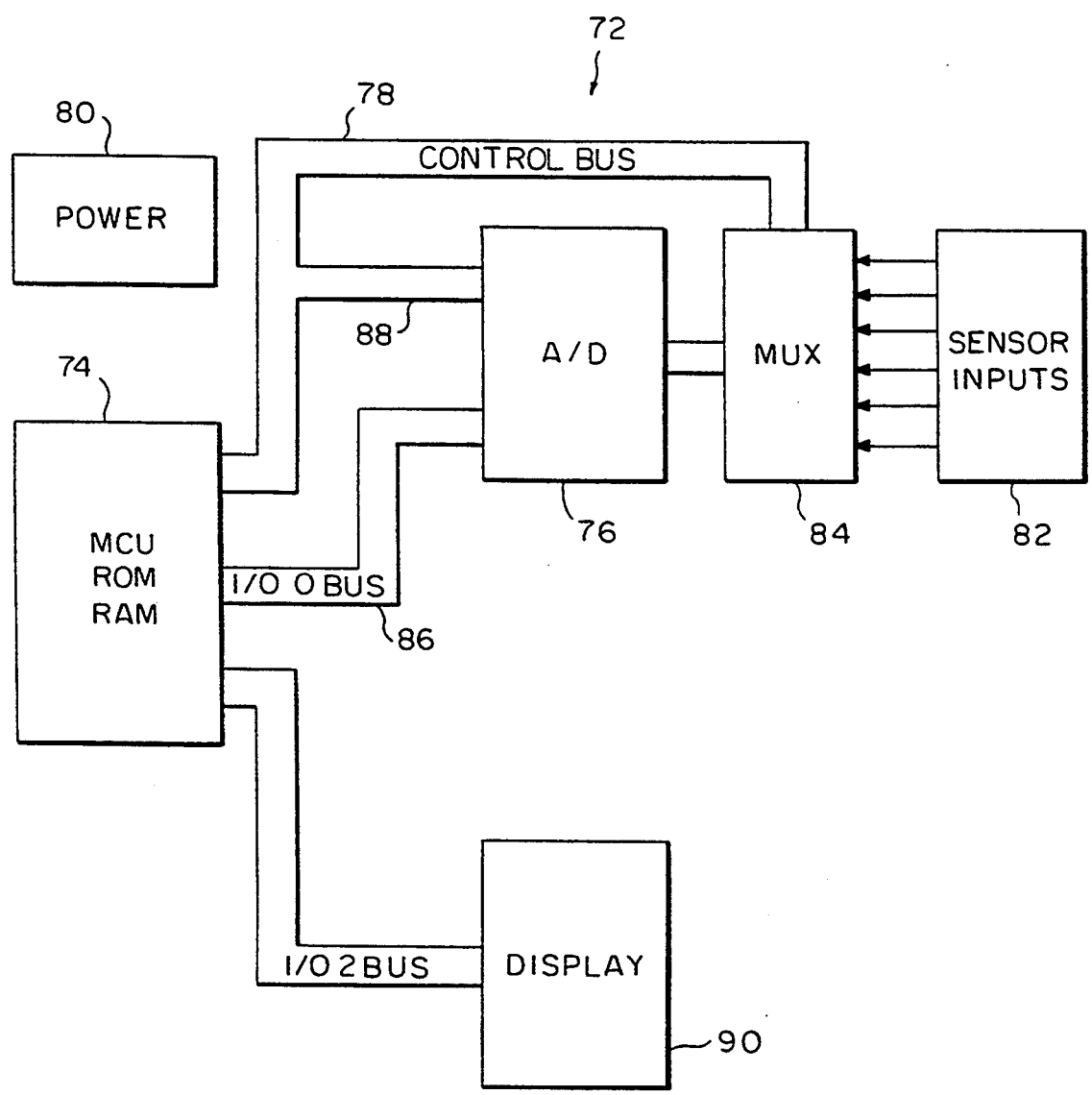
FIG. 5 is a block diagram showing the general system of the present invention.

Referring to FIG. 1, there is shown at 50 the dynamic realtime management system in accordance with a preferred embodiment of the present invention. As shown, the management system 50 is illustrated in block diagram form. The management system 50 of the present invention is described with reference to its application in automobiles, boats, and helicopters. However, it is to be understood that the principles of the invention are also applicable to the control and operation of systems other than automobiles, boats, and helicopters, as will be readily apparent.

In FIG. 1, a local processor 52 is positioned within a vehicle. The processor 52 has a plurality of direct realtime inputs 54. Exemplary individual inputs extending to line 54 are identified on lines 1–17 and lines 39–43.

Lines 1–17 are in reference to the conditions affecting the engine of an automobile. Lines 39–43 are, in particular, applicable to the analysis of conditions affecting a helicopter.

The microprocessor 52 includes a plurality of manual inputs 56. The manual inputs 56 are for management purposes. Exemplary manual management inputs are indicated by lines 20–28 in FIG. 1.

The direct realtime inputs 54 are fed into the microprocessor 52. As they are fed to the microprocessor, the analog output of each of the sensors associated with the direct realtime input 54 is changed to a digital input into the microprocessor 52. The microprocessor 52 further includes a multiplexer, a ROM memory, and a RAM memory. The memory of microprocessor 52 is suitable for storing the sensed values of the realtime inputs 54 and for storing a plurality of programs for defining the relationships between the sensed values of the realtime parameters 54. The processed information relating to the realtime inputs 54 is transmitted to a display 58. Display 58 is suitable for producing a humanly perceivable signal relative to the condition of the particular component of the powered vehicle. The display 58 can be a visual monitor showing the condition. Alternatively, the display 58 can be a light or audio signal indicative of the condition. A long-term memory 60 is also connected to the microprocessor 52 to store information provided by the microprocessor 52.

If the management system 50 is used in connection with an external monitoring system, then the microprocessor 52 may be connected to a transmitter/receiver 62. The transmitter/receiver 62 is suitable for transmitting the signal from the microprocessor 52 to another location 64. For example, the transmitter/receiver 62 may be employed when the vehicle is part of a fleet of vehicles. The transmitter/receiver 62 can be connected to the transmitter/receiver 64 by a suitable satellite link, or other means of communication. The transmitter/receiver 64 passes a signal to a central processor 66. The central processor 66 can deliver the signal to a terminal 68. Terminal 68 includes a display. Terminal 68 is suitable for providing direct input information to the microprocessor 52. As such, suitable management information can be input to the microprocessor 52 such that the management information can be interactive with the realtime input 54. Additionally, a memory 70 is provided for storing the information of central processor 66.

With respect to the direct realtime inputs 54, alternator belt 1 is an input sensor which senses the rotation of the alternator belt. In particular, a voltage from a Hall-effect device determines the rotation of the alternator belt. The sensing of every revolution of the alternator belt is a continuous realtime input to the microprocessor 52. The battery sensor 2 is connected to the automobile battery for constantly sensing the voltage of the automobile battery. Battery sensor 2 provides voltage information as an input to the microprocessor 52. The battery voltage is read in realtime 250 times per second. The battery voltage is updated every second. The alternator motor sensor 3 provides a realtime input to the microprocessor of whether the alternator motor is operating properly. In particular, the alternator motor sensor 3 senses the alternator output voltage. A regulator sensor 4 is provided so as to provide constant realtime input to the microprocessor 52 of the condition of the regulator. The starter switch sensor 5 senses the start switch voltage and measures such voltage. The measuring of the start switch voltage determines if the switch connects the battery voltage to the starter solenoid and to the starter motor. Starter solenoid sensor 6 senses the voltage to the solenoid to determine if the solenoid is defective. Starter motor sensor 7 monitors the starter motor voltage in order to determine if the battery voltage turns the starter motor on. The starter motor sensor 7 also senses that if the battery voltage does not turn the starter motor on and the voltage is still connected to the starter motor, then the starter motor is defective. Water temperature sensor 8 and water pressure sensor 9 are continually monitored to indicate the flow of water and to indicate if the water is being properly cooled. The water temperature sensor 8 and the water pressure sensor 9 are interactive to indicate whether or not there is a leak in the radiator or hoses of the engine. The water temperature sensor 8 and the water pressure sensor 9 will further indicate whether or not the water pump of the engine is working properly. The water pump sensor 10 is monitored by an RPM indicator on the pulley (or by a noise sensor) to determine whether the water pump is working properly. If the water pump sensor 10 shows that the water pump is not rotating, then it is an indication that the water pump is broken or that the belt which turns the water pump is broken. The water pump belt sensor 11 is a Hall-effect sensor or a magnetic marker on the water pump belt. Water pump belt sensor 11 determines whether the belt is broken or whether the belt is working properly. The voltage-pressure switch sensor 12, the compressor motor output sensor 13, the compressor belt sensor 14, the blower motor sensor 15, the freon level sensor 16, and the cooling temperature sensor 17 are all continually monitored and their outputs fed into the processor 52 to determine any single change which might affect the total air conditioner system. An abnormal reading from the sensors 12–17 would provide an indication of the defect and of the need for repair. Pressure measurements are fed to the processor 52 in realtime.

If the management system 50 is used in connection with a helicopter, then torque sensor 39, RPM sensor 40, horsepower sensor 41, air-speed sensor 42, and height/altitude sensor 43 are employed as realtime inputs 54 to the microprocessor 52. The engine speed (RPM) is determined by the shaft speed of the power plant in revolutions per minute by the shaft speed sensor. The shaft speed of any engine in the power system is measured in a similar manner. Horsepower sensor 41 calculates horsepower in realtime as the product of the shaft speed times the torque divided by a suitable number to produce metric horsepower equivalents. Helicopter air speed is indicated by the air speed indicator aboard the helicopter. The altitude is taken from the altimeter sensor on the helicopter. The sensors 39–43 are sensors which are available for connection to the microprocessor 52 and are suitable as processor inputs.

Management inputs 20–28 are various factors that can be provided to the microprocessor for interaction with the realtime data 54. Inputs 20–28 act as "optimizing" variables. These management variables can affect the operator's decision as to whether a repair is needed immediately, the cost of the repair, the economics of the unrepaired engine, and various other factors. The inputs 20–28 are preprogrammed information which are placed in the processor software. Alternatively, the management inputs 20–28 can be input by terminal 68 directly into the microprocessor. This predetermined information may be used in conjunction with the realtime inputs 54, if desired. For example, these management inputs can indicate the cost of fuel for operating the air conditioner. They can indicate the labor costs or time needed to have the water pump replaced. The management inputs can also indicate a dead battery, the time needed to replace a dead battery, and the time when the vehicle is started and moving again. As long as the vehicle is being driven, the system is continually analyzing and sensing the realtime inputs 54. This provides the operator of the vehicle with information never before available.

FIG. 5 illustrates a circuit 72 of the present invention. The system 72 is configured around a microcontroller 74 which has a RAM. The instruction set (software programming) controlling the microcontroller 74 is stored in an EPROM. Any internal computed parameters are stored in the RAM in the microcontroller 74. The input battery voltage is applied to the input of the analog-to-digital converter 76. The accessory and ignition signals are applied to a databus 78 and are used to control the analysis procedure.

In FIG. 5, a power supply 80 is shown. Power supply 80 is suitable for providing an operating current to the microcontroller 74. The power supply 80 should be independent of the power system of the vehicle. The power supply 80 may be a regulated power supply which obtains its power from the car battery. Variations in the condition of the voltage from the car battery do not affect the power output from the power supply 80. Realtime sensors 82 represent the system sensor input modules. The sensor inputs 82 may measure battery voltage, the voltage from a Hall-effect device to verify belt pulley rotation, the voltage across a pressure switch to indicate abnormal pressure in an air-conditioning system, etc. The sensor inputs 82 can also be outputs from a motion sensor or a vibration sensor as part of the vehicle security system. The sensor inputs 82 generally correspond with the sensors indicated in FIG. 1. A time-division data multiplexer 84 receives the signals from the sensor inputs 82. The multiplexer 84 continually sequences through all of the sensor inputs 82. The data output from the multiplexer 84 enters the analog-to-digital converter 76 so as to convert the analog signal into digital input for the microcontroller 74. The digital outputs 86 and 88 are transmitted by suitable databuses as input into the microcontroller 74. The microcontroller, through the control, address, and databuses maintains control of the data processing by determining when the multiplexer 84, the analog-to-digital converter 76, the RAM, and the display 90 are to interact. This control is determined by the software which is stored in the ROM.

Referring to FIG. 2, there is shown at 100 the management system for the evaluation of the starter system of a vehicle. The management system 100 includes a microprocessor 102 that provides an output 104 to a display 106. The display 106 provides information to the operator of the powered vehicle as to the status of the starter system and the repair needed for the starter system problems. A variety of input sensors are provided to transmit information to the processor 102. The input sensors include a starter motor noise sensor 108, a starter motor voltage sensor 110, a starter solenoid sensor 112, a starter switch sensor 114, and a battery sensor 116. The operation of the management system 100 is as follows. The battery sensor 116 senses the battery condition which may be displayed on display 106 to show the charge rate and the percentage that the battery is charged (e.g., "battery 60% charged"). If the starter switch 114 is turned on (engaged), then 13.5 volts will go to the starter solenoid 112 and will be fed into the processor 102. This 13.5 volts will be connected to the starter motor 110 and this voltage will be fed as an input to the processor 102. The starter motor will turn the motor over to start the vehicle or motor of the vehicle. If the starter switch 114 does not feed 13.5 volts as an input to the processor 102, then the display 106 will indicate that the starter switch is bad (the display 106 will present the words "Replace Switch"). If the starter switch is repaired properly, the display 106 will indicate that the starter switch is in proper condition. The display will read "Starter Switch O.K.". If the starter switch 114 feeds 13.5 volts to the processor 102 and the starter solenoid 112 does not put 13.5 volts into the input of the processor 102, then the display 106 will indicate a defective starter solenoid. If the starter solenoid is repaired, the display 106 will indicate that the solenoid is in proper condition. If the starter switch 114 puts 13.5 volts into the input of processor 102 and if the starter solenoid 112 also puts 13.5 volts into the input of processor 102, and if the starter motor 110 has 13.5 volts on it and the starter motor voltage is fed into the input of the processor 102, then when the motor does not turn over to start, the starter motor noise sensor 108 will feed zero voltage into the input of processor 102. The display 106 will indicate a bad starter motor (e.g., "Repair Starter Motor"). If the starter motor is repaired, then the display will indicate that the starter motor is in proper condition. In this instance, when all of the voltage goes to the proper equipment in the starter system, and the starter still does not turn over, then the problem must lie in the starter motor. The noise detector does not transmit voltage to the processor 102 because, even though the starter motor has the correct voltage on it, it does not start. The starter motor noise sensor 108 would sense the noise and deliver a proper input to the processor 102 if the starter turned over.

FIG. 3 illustrates at 120 the management system of the present invention as applied to the motor cooling system. As can be seen, the management system 120 includes a microprocessor 122 and a suitable display 124. With reference to FIG. 2, the processor 122 can be the same processor as processor 102 of FIG. 2. Additionally, the display 124 can be the same display as display 106. To determine the condition of the motor cooling system, a variety of sensor inputs are directed toward processor 122. In particular, management system 120 includes a water temperature sensor 126, a water pump sensor 128, a water pump belt sensor 130, and water pressure sensor 132.

The motor cooling system is composed of water pumped through the motor, the radiator, the hoses, and other items, in order to prevent the motor from overheating. If any one of the inputs 126, 128, 130, and 132 starts to show abnormal conditions, it will affect the rest of the inputs. In other words, with the motor cooling system, the inputs are all interrelated and the interaction among them determines the condition of the cooling system.

If the water temperature 126 becomes abnormal, the problem can be the water pump 128, the water pump belt 130, or the water pressure 132. The processor 122 will analyze each of the inputs in order to tell the operator of the vehicle the item to repair.

If the water pressure radiator 132 has a leak, the pressure signal to the processor 122 will indicate a lower water pressure signal. If the water temperature 126 is proper to the processor 122 and if the water pump 128 provides a proper signal to the processor 122 and if the water pump belt signal 130 is normal, then the processor will analyze these inputs and indicate on the display 124 that there is a leak in the water pressure radiator 132 or in the hoses associated therewith. The display 124 will advise the operator to repair the radiator or hoses. After repairs are made to the radiator and hoses, the processor 122 will analyze the repairs so as to determine whether the repairs are correct and whether the system is properly functional. The display 124 will indicate whether the motor cooling system is properly functional or not.

As another example, if the water pump belt 130 breaks, the input signal from the water pump belt sensor 130 will be zero. In this instance, the water temperature signal 126 will be above normal, the water pump noise voltage input 128 will be zero, and the water pressure 132 will be above normal. The processor 122 analyzes these inputs and their effect on one another, and displays an indication that the water pump belt 130 is broken. The display 124 can also provide the indication to "Replace Belt". If the belt is properly repaired, the processor 122 will see the normal inputs and interaction and will display an indication that the repairs are correct by stating "Water Cooling System O.K.". If the repairs are not correct, the processor 122 will continue to indicate on display 124 that the water cooling system needs repairing.

FIG. 4 illustrates the management system 140 of the present invention as applied to the charging system of a powered vehicle. As can be seen, management system 140 includes a processor 142 that is connected to a display 144. Display 144 includes a red light 146 and a green light 148. Display 144 also is suitable for displaying various worded messages 150. The processor 142 receives inputs from an alternator motor voltage sensor 152, an alternator motor belt sensor 154, and a battery voltage sensor 156. Each of these inputs interact to provide a proper display of the condition of the charging system of the powered vehicle.

The processor 142 begins to continually scan the battery voltage 156 in one-second intervals. The processor 142 computes an average during that one-second interval and stores that average in the processor's RAM. The average from the previous one-second interval is replaced by the average from the current one-second interval. The one-second average is used to determine the condition of the charging system (too high or too low or O.K.). In this manner, the charging system is continually monitored and evaluated in real-time.

The processor 142 receives inputs from the sensors 152, 154, and 156 continually at 250 times per second and updates this information every second. Any slight change in any input affects the total evaluation of the battery charging system. The evaluation of the battery charging system is based on the amount of charge which is being put into the battery over a given length of time. If the alternator motor voltage 152 feeds an average voltage to processor 142 between, for example, 13.5 volts and 14.5 volts, the display 144 will indicate that the charging system is properly functional. If the alternator motor 152 feeds a voltage which is too low to the processor 142, then the display 144 will indicate that the charge is low and that the alternator should be repaired. In particular, the display 144 will indicate message 158. Once the alternator is repaired, then the display 144 will present message 160, which reads "Charger O.K."

If the alternator motor 152 feeds an average voltage which is too high to the processor 142, then the display 144 will indicate that the charge is high and that the alternator should be repaired. In this situation, the display 144 will display message 162 which is "Charger High—Repair". After the repair, the display 144 should indicate message 160 which is "Charger O.K."

If the alternator belt sensor 154 indicates that the belt is properly functional and is turning the alternator and if the noise detector on the alternator motor 152 indicates that the motor is turning and if the output voltage from the alternator motor 152 is zero, then the alternator is bad. The processor 142 will transmit a signal to display 144 to indicate that the alternator is bad and that it should be repaired. As such, display 144 will show message 164 stating "Bad Alternator Motor—Repair". Once the repairs are carried out, the readings will return to normal and the display will flash message 160 that the charging system is properly functional. Additionally, green light 148 will flash to indicate that everything is properly functional.

In the case of the situation in which no signal is sent from the noise detector on the alternator motor and if the alternator belt rotation sensor 154 indicates that the alternator belt is rotating, then the processor 142 will indicate that the alternator motor is bad and that the alternator motor should be repaired. Once again, message 164 will flash on display 144. Additionally, red light 146 will become illuminated. When the alternator motor is repaired, the green light 148 will illuminate and message 160 will flash on display 144.

If the sensor from the alternator motor belt stops sending a signal to processor 142, then the alternator voltage output from sensor 152 will be zero to the processor 142. Additionally, the charge to the battery 156 will be zero. The display will then indicate message 166 which is "Bad Alternator Motor Belt—Repair". When the alternator motor belt is repaired, message 160 will be presented on display 144. Additionally, when the repairs are completed, message 168 "Alternator Motor—O.K." and message 170 "Alternator Belt—O.K." will also flash on display 144.

Figure 6:
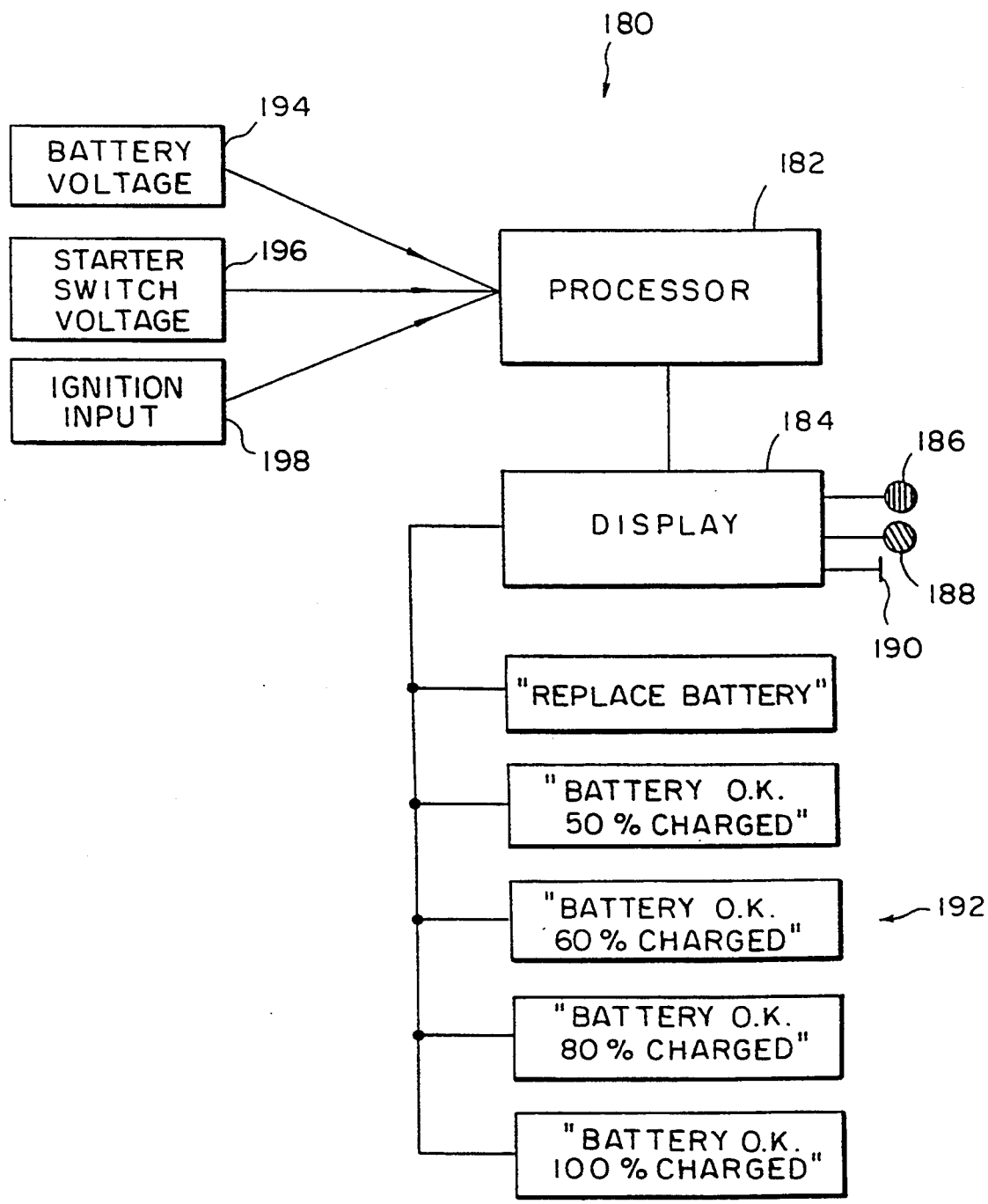
FIG. 6 is a block diagram showing the management system of the present invention as applied to the sensing of battery condition.

Referring to FIG. 6, there is shown at 180 the management system of the present invention as applied to the detection of battery condition in a powered vehicle. Management system 180 includes a processor 182 that provides a suitable output to illuminate display 184. Display 184 includes a red light 186, a green light 188 and an audio output 190. Additionally, display 184 can present alphanumeric displays 192. The processor 182 receives inputs from a battery voltage sensor 194, a starter switch voltage sensor 196 and an ignition input sensor 198.

When the ignition to the powered vehicle is turned off, the processor 182 continually scans the battery voltage 194 at 250 cycles per second and stores this information on the processor's RAM. For each one-second interval, the processor 182 computes and averages voltage for that one-second interval. The average from the previous one-second interval is replaced by that of the present interval and stored in the processor's RAM.

When the starter switch 196 is turned to the accessory position, the twelve volts from the starter switch 196 is connected to the accessory input which signals the processor 182 to stop scanning the vehicle battery voltage 194 and wait for a twelve-volt signal to be applied to the ignition input 198. When the starter switch 196 is turned to the start position, the twelve-volt signal is connected to the ignition input 198 and signals the processor 182 to start scanning the battery voltage 194. When the ignition input signal returns to zero, the processor 182 stops scanning the battery voltage 194 and computes the minimum battery voltage during the start interval as well as the average battery voltage during the start interval. The processor 182 will determine the condition of the battery by computing a battery charge level. The battery charge level is computed from the average battery voltage when the starter switch is in the off position and from the minimum voltage and the average battery voltage when the starter switch was in the start position. The battery charge level may be presented on display 184 by way of messages 192 These messages include "Replace Battery" "Battery O.K. 50% Charged", "Battery O.K. 60% Charged", "Battery O.K. 80% Charged", and "Battery O.K. 100% Charged". If the battery cannot hold a charge from the charging system, the battery is defective and will eventually lose its charge. The display 184 will tell the operator to replace the battery. Specifically, at the time that the battery becomes defective, the red light 186 will start blinking. When the defective battery is replaced with a functional battery, the red light 186 will stop blinking and the green light 188 will become illuminated. This indicates that the battery is able to hold a high percentage of the charge within itself, while being charged. Additionally, an audio signal 190 can be transmitted when the battery is defective. The audio signal provides an additional cue to the operator of the powered vehicle to replace the battery.

Figure 7:
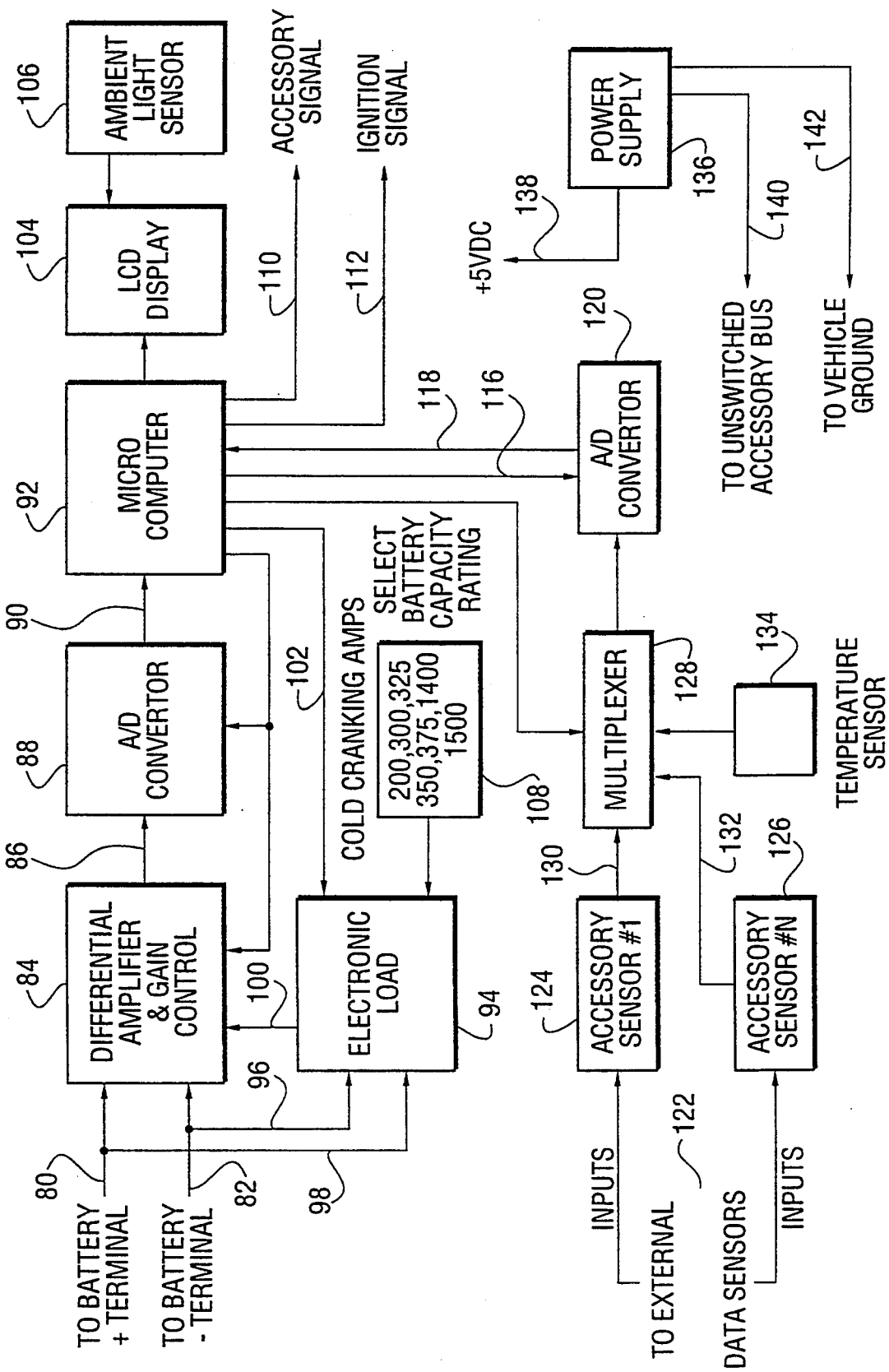
FIG. 7 is a block diagram showing the details of the system of the present invention as applied to the sensing of battery condition.

Referring to FIG. 7, there is shown the detailed block diagram for the monitoring system for battery condition. The block diagram shown in FIG. 7 embodies the principle of a relationship between the typical battery open circuit terminal voltage (the battery voltage measured with no load on the battery) and the charge level of the battery. The following table represents a typical relationship for a conventional automotive battery.

TABLE I

| CHARGE LEVEL | TERMINAL VOLTAGE |
|---|---|
| 100% | 12.68 |
| 75% | 12.45 |
| 50% | 12.24 |
| 25% | 12.06 |
| 0% | 11.89 |

In general, relying on just this information, errors due to various battery sizes and temperatures can approach twenty to twenty-five percent. The above-identified table only reflects averages and does not reflect the temperature changes which will determine the actual available battery capacity. The battery monitoring system of the present invention provides a more accurate estimate of the battery charge level than the above table.

As can be seen in FIG. 7, lines 80 and 82 are connected to the automobile battery. Specifically, line 80 is connected to the positive terminal of the battery. Line 82 is connected to the negative terminal of the battery. Each of these lines is connected to a differential amplifier and gain control circuit 84. Line 86 connects the differential amplifier and gain control circuit 84 to an analog-to-digital converter 88. Line 90 connects the analog-to-digital converter 88 to the microprocessor 92. The differential amplifier and gain control circuit 84 is presented with the differential voltage across the terminals 80 and 82 of the battery. The differential amplifier amplifies the signal of the differential voltage and transmits it to the analog-to-digital converter 86. The analog-to-digital converter is used for converting the analog signal from the differential amplifier 84 into digital information for transmission to the microprocessor 92.

In FIG. 7, an electronic load 94 is connected to lines 80 and 82 by way of lines 98 and 96, respectively. The electronic load is adjusted to draw, for example, ten amps from the battery in a prescribed time sequence. The time sequence may be adjusted depending on the estimated charge condition of the battery and the time the vehicle was last started. The electronic load 94 is turned on for approximately thirty seconds at timed intervals of one hour or more. The electronic load 94 is connected by line 100 to the differential amplifier 84 so that the signal from the electronic load 94 is transmitted to the microprocessor 92. The microprocessor 92 is connected to the electronic load 94 by line 102. The microprocessor 102 activates the electronic load to apply the proper load across the battery. While the electronic load 94 is across the battery, the battery terminal voltage and the battery temperature are recorded. At the end of the test sequence, the microprocessor 92 calculates the internal thevenin resistance of the battery by dividing the battery terminal voltage under load by the load current. The cranking amp capacity of the battery is computed from the ratio of the open circuit terminal voltage to the thevenin (internal) resistance. The cold cranking amp (CCA) capacity of the battery is then estimated from a temperature correction applied to the previously computed cranking amp capacity.

The cold cranking amp capacity is displayed as a percent of rated battery capacity at LCD display 104. The driver of the vehicle is able to determine the capacity of the battery for starting the automobile from the signal on the LCD display 104. Various signals can be displayed on the LCD display for properly informing the driver of the condition of the battery. The displays can be numerical displays of the percent of rated battery capacity or can be an audio display informing the driver of the battery capacity for starting the vehicle. An ambient light sensor 106 is interconnected to the LCD display to control the back light of the LCD display 104. In bright daylight, the back light intensity would be greater than required during nighttime conditions.

A selector switch 108 is connected to the electronic load 94 to provide a control signal to the load 94 depending on the nominal rated capacity of the battery under test. Values from 200 to 1500 amps can be marked on the selector switch. The nominal rated capacity of the battery is usually marked on the battery when it is originally purchased. The selector switch 108 can be adapted to provide information to the microprocessor regarding the various capacities of batteries. The actual values of 200 to 1500 amps should not be construed as a limitation of the present invention.

In addition to measuring the cold cranking amp capacity of the battery, the system of the present invention also records a history of battery temperature and voltage, both before and during the starting sequence, over the past ten vehicle starts. If these voltages show a declining trend which exceeds a tolerance limit, then this information is displayed by the LCD display 104. The LCD display 104 provides a warning of the reduced battery performance.

As shown in FIG. 7, the microcomputer 92 is also connected to an accessory signal 110 and to an ignition signal 112. The accessory signal 110 is a signal that the ignition system of the automobile is in its accessory mode. The ignition signal 112 indicates that the automobile has been started.

The microcomputer 92 is also interactive along lines 116 and 118 with an analog-to-digital converter 120. The converter 120 is connected with a variety of external data sensor inputs 122. The external data sensor inputs 122 can accommodate either analog or switch inputs from, for example, an oil pressure transducer, an oil pressure switch, a radiator coolant pressure transducer, an air-conditioning coolant pressure transducer, an RPM pickup from a rotating belt or pulley wheel, or a variety of other items within the powered vehicle. A sensor 124 and a sensor 126 are connected to these external data inputs 122. A multiplexer 128 is provided to process the signals from the variety of sensors. The multiplexer addresses the various sensor signals transmitted along lines 130 and 132. It is important to note that the present invention contemplates more than the two sensors 124 and 126. A very large number of sensors can be incorporated within the system of the present invention.

Importantly, a temperature sensor 134 is connected, as an input, to the multiplexer 128. The temperature sensor 134 monitors the temperature of the battery. Because the battery's performance is directly related to the temperature at which it operates, it is important to provide temperature information to the microprocessor 92. The temperature information is important for calculating the cold cranking amp capacity of the battery.

An independent power supply 136 is connected along line 138 to the microprocessor 92. One line 140 of the power supply 136 is connected to an unswitched accessory bus 140. Another line 142 is connected to a vehicle ground. The independent power supply allows the present invention to operate without direct connection to the power of the automotive battery. A system reset push button is provided in the circuit. The battery monitoring system of the present invention may be miniaturized using surface mount technology.

Figure 8A:
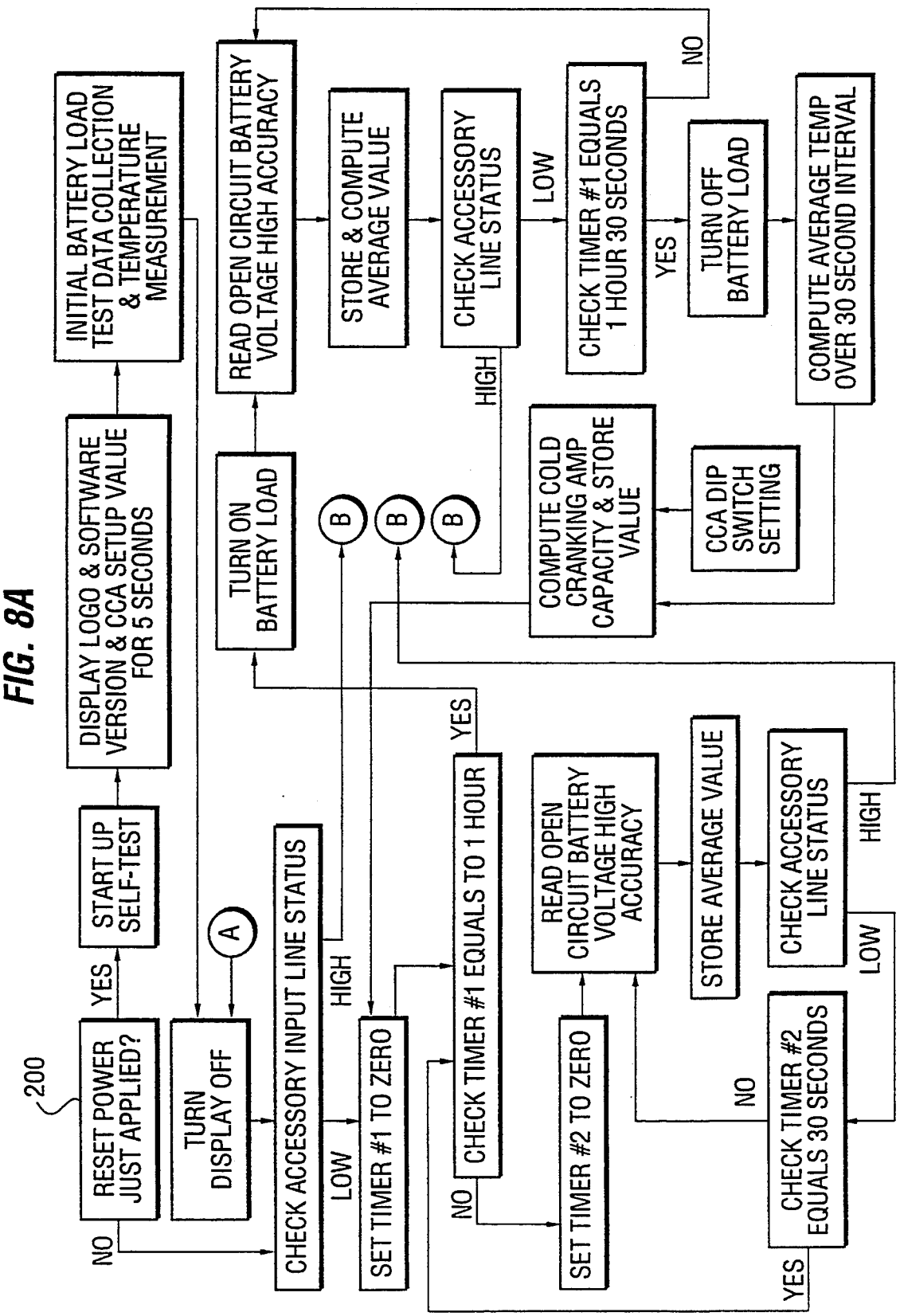
FIGS. 8A–8D show the program logic diagram for the battery condition sensing system of the present invention.

FIGS. 8A–8D show the program logic diagram for the microprocessor 92. In FIG. 8A, the initial start up and "sleep" mode sequence is illustrated. This sequence is used when the vehicle is parked for an extended period of time. Initially, it is necessary to determine whether the reset power has been applied, as shown at block 200. If it has been applied, then the program goes through a self-test sequence of the microprocessor and an initial collection of battery load test data and temperature measurements to compute an initial estimate of the cold cranking amp rating of the battery. The display turns on for approximately fifteen seconds to display the logo, the software version, and the cold cranking amp setup value as determined by the switch setting 108. The display is then turned off. The accessory line status is then checked for a "high" or a "low".

If the reset power has not been applied, then the accessory line status is checked for a "high" or a "low". If the line is "high" then the ignition signal is in the accessory position. The microprocessor should prepare for a possible engine start attempt. Under such circumstances, the program-sequence continues at "B" on FIG. 8B.

On the other hand, if the accessory line is "low", then the ignition switch is turned off, and no engine start is imminent. Then, the electronic load 94 is connected to the battery at desired intervals for continually monitoring the status of the battery while the engine is off. The remaining steps on FIG. 8A apply a load of approximately ten amps for thirty seconds every hour to measure the battery terminal load voltage. The ratio of the load voltage to the load current is an estimate of the internal resistance of the battery. The ratio of the battery open circuit voltage to the internal resistance, corrected for ambient temperature, is a measure of the cold cranking amp rating of the battery. The switch 108 provides 256 possible settings of rated battery cold cranking amp capacity over a range of approximately 200 amps to 1500 amps.

Figure 8B:
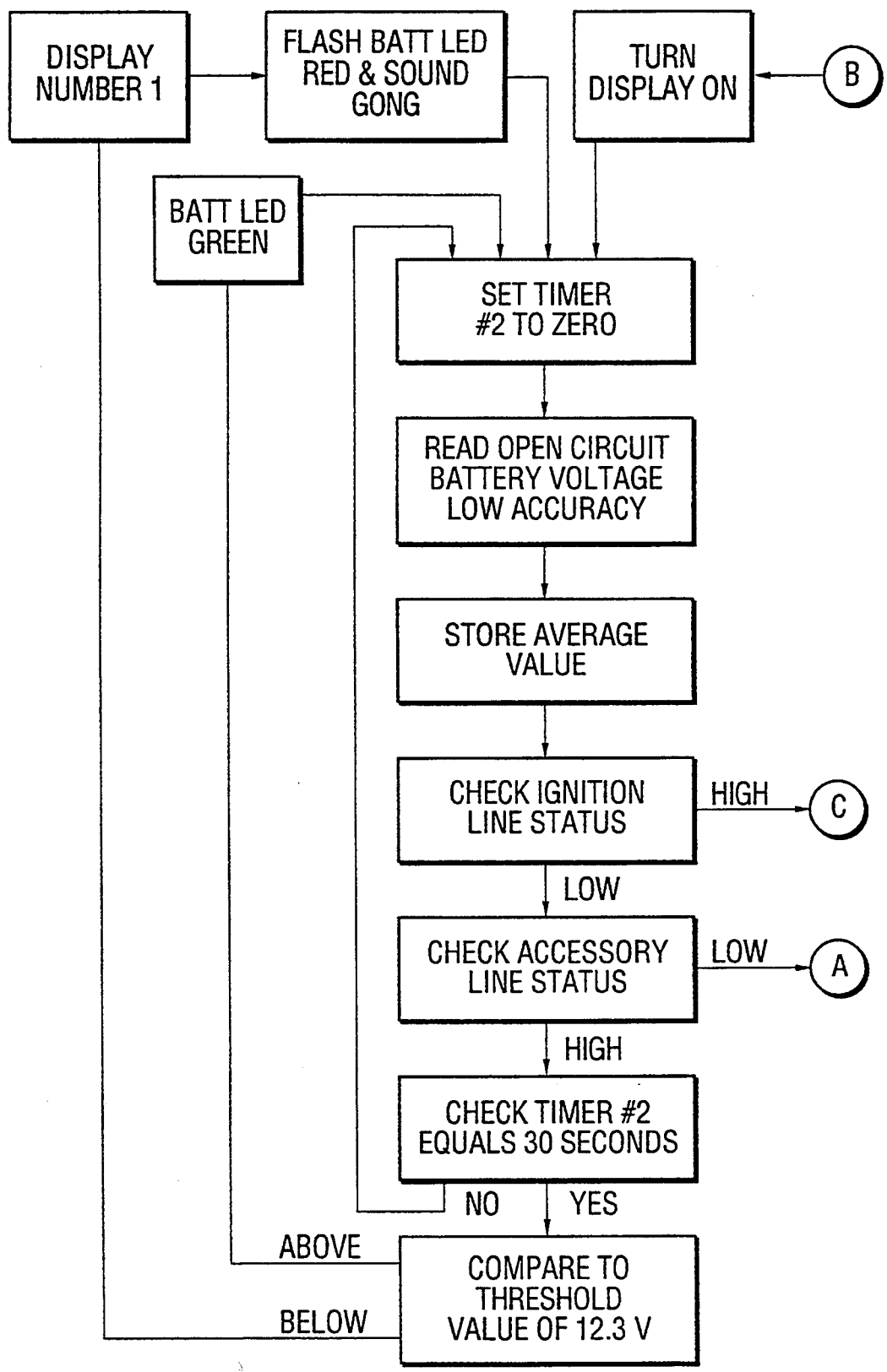

FIG. 8B shows the program logic when the ignition switch is in the accessory position. When the ignition switch is in the accessory position, the computer must be able to anticipate if one of the following conditions will occur: (a) an engine start attempt, (b) continued use of one or more accessories with no start attempt, or (c) return to the ignition "off" position.

The system of the present invention follows the sequence shown on FIG. 8B when the accessory line goes "high". The LCD display is turned on and will read "Accessory Input Detected". Timer number 2 is set to 0 so that the computer will proceed to collect an average of the battery terminal voltage over a running thirty-second wide window. This sequence will continue until either the accessory line goes "low" (thereby returning to FIG. 8A at "A"), or the ignition line goes "high" (thereby proceeding to "C" in FIG. 8C). When timer number 2 reaches thirty seconds, then the thirty second voltage average is computed and stored and compared to a nominal threshold value of, for example, 12.3 volts. If the computed average is above this threshold, then the battery LED is lit green and the computer resets itself to compute and store another thirty second running average of the battery terminal voltage. If the computed average is below the threshold, the LCD displays display number 1, for example, the words "Continued Use of Accessories May Make Vehicle Difficult to Start". Simultaneously, the battery LED flashes red and a gong is sounded every thirty seconds.

Figure 8C:
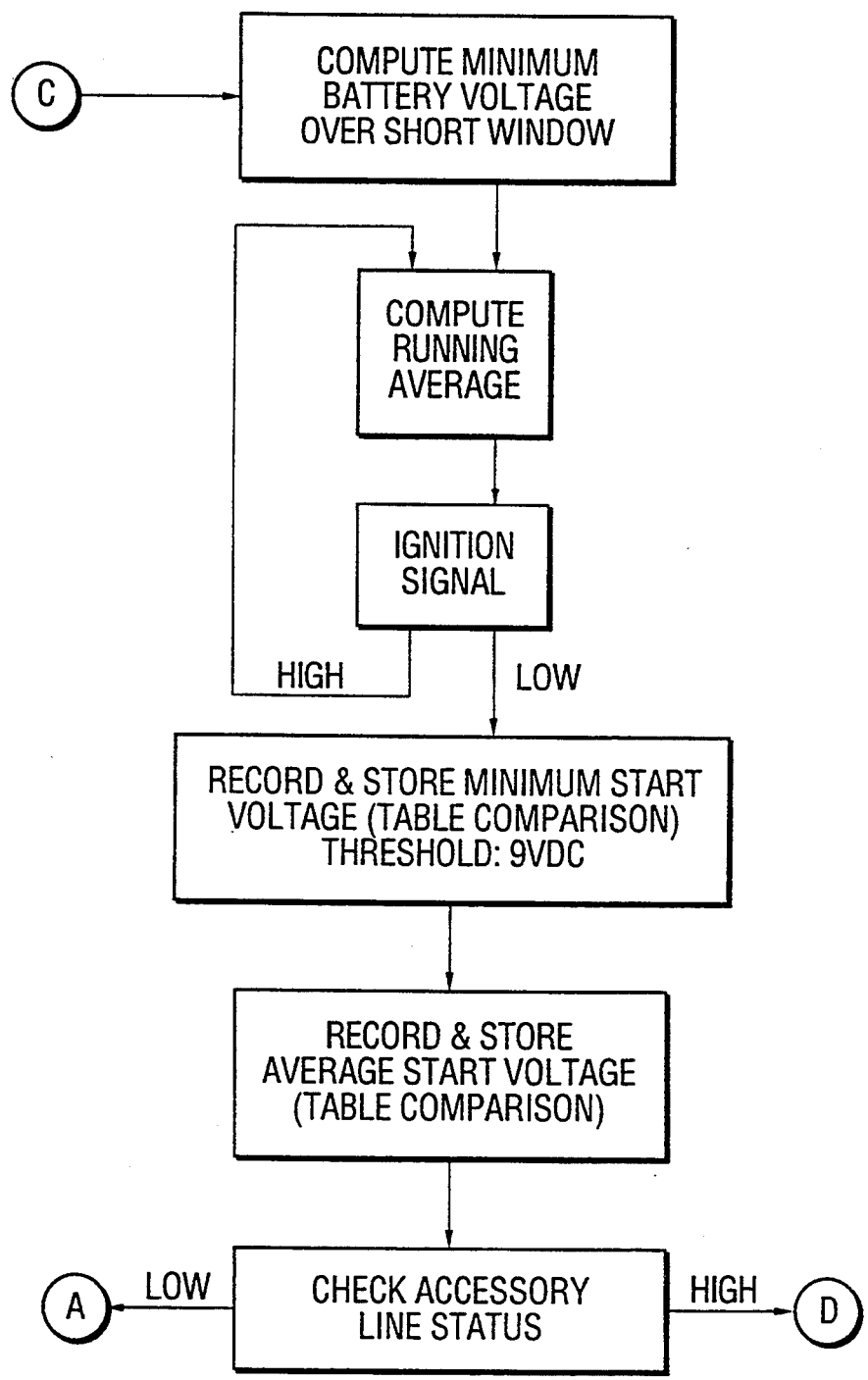

Referring to FIG. 8C, this sequence of program steps is reached only if both the accessory and ignition lines have gone "high". The computer is now recording battery terminal voltage during an engine start attempt. A short data buffer is filled with battery terminal voltage in order to capture the minimum voltage during the initial starting sequence. The actual minimum will be read after the engine has started. Once the short data buffer is filled, the computer begins computing a running average of the battery terminal voltage during the start attempt. This average value, along with the measured minimum, will be stored and used to determine the overall battery condition once the ignition line goes "low". If the accessory line is still "high" the program moves to "D" in FIG. 8D. If the accessory line is "low" it is assumed that the engine has been turned off and the ignition switch is in the "off" position. The computer then returns to "A" in FIG. 8A to turn off the LCD display and resume the one-hour interval load testing of the battery.

Figure 8D:
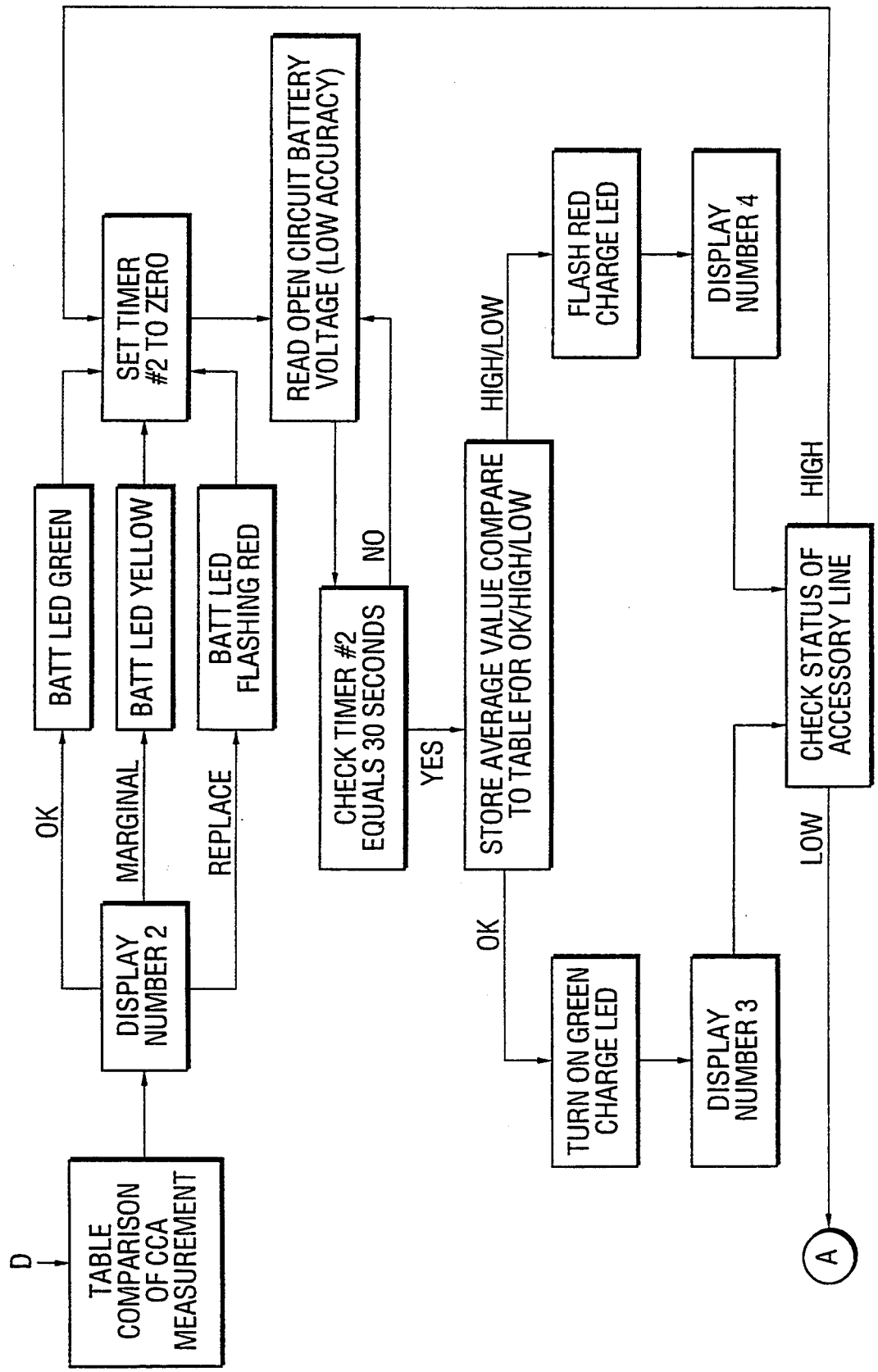

In FIG. 8D, the illustrated sequence of program steps is reached only after the engine has successfully started. This sequence of steps is an evaluation of the charging system. After an evaluation of the battery condition which includes the minimum starting voltage, the average starting voltage, and the cold cranking amp measurement, display number 2 is shown and the battery LED will be lit either green, yellow, or flashing red depending on the battery condition. Timer number 2 is set to 0, and a thirty second running average of the battery terminal voltage is computed and stored. If this average is above a stored reference value (for example, approximately 14.5 volts) or below a stored reference value (for example, approximately 12.8 volts), the charge LED flashes red and display number 4 is shown. Otherwise, the charge LED is lit green and display number 3 is shown.

As long as the accessory line is "high" the computer assumes that the engine is running and continues to collect thirty second averages of the battery terminal voltage to evaluate the charging system. Once the accessory line goes "low" it is assumed that the engine is turned "off" and the computer returns to the program sequence at "A" on FIG. 8A.

As used herein, display number 1 recites "Continued Use of Accessories Makes Vehicle Difficult to Start". Display number 2 recites "Battery OK" or "Battery Marginal" or "Battery Replace" along with "% CCA=xxx". Display number 3 reads "Charge System O.K.". Display number 4 reads "Service Charging System".

The present invention provides an automatic, real-time, continuous evaluation of systems within the powered vehicle. The management system of the present invention will continuously tell the operator of the degradation of the system or of an actual breakdown of a component that prevents the system from functioning properly. The system also informs the operator as to what needs to be repaired. The invention provides the information to the operator of the vehicle so that the operator of the vehicle can decide when to fix the problem and allows the operator of the vehicle to shop around for costs.

The present invention also eliminates the need to hire a person, such as a mechanic, to determine the specific problem. In particular, the present invention acts as a diagnostic instrument and allows the unskilled operator of the powered vehicle to determine the repair which is necessary. This prevents unnecessary charges for parts and labor that are unwarranted by the particular problem. After the repair is completed, the management system of the present invention will inform the operator of whether or not the repair has been done properly. If the repair has been properly carried out, then the system will indicate that the powered vehicle is functioning properly. The system further can evaluate whether the replacement parts are in good condition. For example, the present invention would indicate if a used battery were substituted during the course of a repair. The present invention allows the operator direct access to information generated from the powered system in order to enable the operator to make reasonable, logical management decisions. It allows the operator to cure costly problems and inefficiencies quickly and reliably.

The foregoing disclosure and description of the invention is illustrative and explanatory thereof. Numerous variations, alterations, and changes in the details of the described embodiments may be made without departing from the spirit and scope of the present invention as defined in the appended claims and equivalents thereof.

What is claimed is:

1. A dynamic realtime management system for managing a condition of a powered vehicle, comprising:
   a microprocessor for continuously and automatically sensing a plurality of realtime parameters related to components of said powered vehicle;
   a memory for storing sensed values of said realtime parameters and for storing a plurality of programs for defining relationships between certain of said sensed values of said realtime parameters; and
   a display connected to said microprocessor, for producing a humanly perceivable signal; wherein
   said microprocessor includes means for continuously and automatically determining interactions between said sensed values using said stored programs, means for continuously and automatically producing an interaction indication result, means for continuously and automatically producing a condition output which is indicative of the relationship between said sensed values and said interaction indication result, and means for automatically transmitting said condition output to said display.

2. The system of claim 1, further comprising:
   a terminal connected to said microprocessor for selecting a desired condition output to be transmitted to said display.

3. The system of claim 1, further comprising:
   a plurality of input sensors connected to said microprocessor to transmit said sensed values to said microprocessor.

4. The system of claim 3, further comprising:
   an analog-to-digital converter, connected between said input sensors and said microprocessor, for converting an analog output of said input sensors to a digital input to said microprocessor.

5. The system of claim 3, further comprising:
   a power source, connected to said microprocessor, for supplying a voltage to said microprocessor, said power source being independent of a battery of said powered vehicle.

6. The system of claim 1, wherein said powered vehicle is an automobile, said condition output is a battery condition, and said realtime parameters include battery voltage, starter switch voltage, and ignition input.

7. The system of claim 6, wherein said display is a visual monitor showing a battery charge level of a battery and wherein said battery charge level is said condition output.

8. The system of claim 1, wherein said display is a light signal indicative of said condition output.

9. The system of claim 1, wherein said means for continuously and automatically determining interactions includes means for commanding certain of said realtime parameters to be held constant, said constantly held realtime parameters thereby acting as comparators so that said microprocessor can sense changes in other of said realtime parameters.

10. The system of claim 2, wherein said terminal includes means for inputting management information into said microprocessor and wherein said microprocessor includes means for interacting said management information with said sensed values.

11. A dynamic realtime management system for managing a condition of a starter system for a vehicle, comprising:
    a plurality of input sensors connected to components associated with the starter system of said vehicle;
    a microprocessor connected to said input sensors for continuously and automatically sensing a plurality of realtime parameters associated with said starter system, said input sensors including means for transmitting sensed values of said realtime parameters to said microprocessor;
    a memory for storing said sensed values of said realtime parameters and for storing a program for defining relationships between certain of said sensed values of said realtime parameters, said microprocessor including means for continuously and automatically determining faulty components of the starter system using the sensed values and the stored program; and
    a display connected to said microprocessor for producing a humanly perceivable signal indicating whether or not a starter system component is faulty.

12. The system of claim 11, wherein said plurality of input sensors includes a starter motor noise sensor, a starter motor voltage sensor, a starter solenoid sensor, a starter switch sensor, and a battery sensor.

13. The system of claim 12, further comprising:
    a terminal, connected to said microprocessor, for allowing input of historical parameters to said microprocessor, said historical parameters being selectively interacted with said realtime parameters.

14. The system of claim 13, wherein said display is positioned within said vehicle and said display includes means for presenting an alphanumeric output indicative of a repair status of the starter system.

15. A dynamic realtime management system for managing a condition of a motor cooling system of a vehicle comprising:
    a plurality of input sensors connected to components of the motor cooling system of the vehicle;
    a microprocessor connected to said input sensors for continuously and automatically sensing a plurality of realtime parameters of said motor cooling system, said input sensors including means for transmitting sensed values of said realtime parameters to said microprocessor;
    a memory for storing said sensed values of said realtime parameters and for storing a program for defining relationships between certain of said sensed values of said realtime parameters, said microprocessor including means for continuously and automatically determining faulty components of the motor cooling system using the sensed values and the stored program; and
    a display connected to said microprocessor for producing a humanly perceivable signal indicating whether or not a motor cooling system component is faulty.

16. The system of claim 15, wherein said plurality of input sensors include a water temperature sensor, a water pump sensor, a water pump belt sensor, and a water pressure sensor.

17. A dynamic realtime management system for managing a condition of a charging system of a vehicle comprising:
    a plurality of input sensors connected to components associated with the charging system of said vehicle;
    a microprocessor connected to said input sensors for continuously and automatically sensing a plurality of realtime parameters associated with said charging system, said input sensors including means for transmitting sensed values of said realtime parameters to said microprocessor;

a memory for storing said sensed values of said realtime parameters and for storing a program for defining relationships between certain of said sensed values of said realtime parameters, said microprocessor including means for continuously and automatically determining faulty components of the charging system using the sensed values and the stored program; and a display connected to said microprocessor for producing a humanly perceivable signal indicating whether or not a charging system component is faulty.

18. The system of claim 17, wherein said plurality of input sensors includes an alternator motor voltage sensor, an alternator motor belt sensor, and a battery voltage sensor.

19. A dynamic realtime management system for managing a condition of a battery of a powered vehicle, comprising:

a battery voltage sensor for measuring voltage of the battery;

a battery temperature sensor for measuring temperature of the battery;

a microprocessor connected to said voltage and said temperature sensors for continuously and automatically sensing said voltage and said temperature;

a memory for storing values of said voltage and said temperature;

an electronic load connected to said battery and said microprocessor and selectively applied to said battery by said microprocessor for drawing a desired amperage of said battery in a prescribed time sequence; and a display, connected to said microprocessor, for producing a humanly perceivable signal; wherein said microprocessor continuously and automatically determines the condition of said battery and transmits a signal indicative thereof to said display.

20. The system of claim 19, further comprising:

an analog-to-digital converter, connected between said sensors and said microprocessor for converting analog outputs of said sensors into digital inputs to said microprocessor.

21. The system of claim 19, further comprising:

a power source, connected to said microprocessor, for supplying a power voltage to said microprocessor, said power source being independent of said battery of said powered vehicle.

22. The system of claim 19, wherein said memory stores values of open circuit terminal voltage over a desired period of time.

23. The system of claim 19, wherein said condition includes a percentage of rated battery capacity and wherein said percentage is transmitted to said display.

24. The system of claim 19, wherein said display is positioned within said powered vehicle and wherein said display is a visual monitor indicative of a percentage of said rated battery capacity.

25. A method of monitoring a condition of a battery of a powered vehicle, comprising the steps of:

measuring an open circuit terminal voltage of the battery;

measuring a temperature of the battery;

applying an electronic load to the battery to draw a desired amperage;

calculating an estimated internal resistance of the battery by dividing a voltage across the battery measured when the electronic load is applied by the desired amperage;

calculating cranking amp capacity of the battery by dividing the open circuit terminal voltage by the estimated internal resistance;

applying a temperature correction factor to the cranking amp capacity to determine cold cranking amp capacity of the battery; and transmitting a signal to a driver of said powered vehicle indicative of the cold cranking amp capacity of the battery.

26. The method of claim 25, wherein said electronic load is applied at timed intervals over a period of time when an engine of said powered vehicle is off.

27. A dynamic realtime management method for managing a condition of a powered vehicle, comprising the steps of:

continuously and automatically sensing a plurality of realtime parameters related to components of the powered vehicle;

storing sensed values of the realtime parameters and storing a plurality of programs for defining relationships between certain of the sensed values of the realtime parameters;

continuously and automatically determining interactions between the sensed values using the stored programs;

continuously and automatically producing an interaction indication result;

continuously and automatically producing a condition output that is indicative of the relationship between the sensed values and the interaction indication result;

automatically transmitting the condition output to a display; and producing a humanly perceivable signal on the display.

28. The method of claim 27, further comprising the step of selecting a desired condition output to be transmitted to the display.

29. The method of claim 27, further comprising the step of transmitting the sensed values to a microprocessor using the plurality of input sensors.

30. The method of claim 29, further comprising the step of converting an analog output of the input sensors to a digital input to the microprocessor.

31. The method of claim 29, further comprising the step of supplying a voltage to the microprocessor from a power source that is independent of a battery of the powered vehicle.

32. The method of claim 27, wherein the step of continuously and automatically determining interactions includes the step of commanding certain of the realtime parameters to be held constant wherein said constantly held realtime parameters act as comparators to sense changes in other of the realtime parameters.

33. The method of claim 29, further comprising the step of inputting management information into the microprocessor and interacting the management information with the sensed values.

* * * * *